April 10, 1951  A. C. G. MENZIES ET AL  2,548,548
CONCAVE GRATING SPECTROGRAPH OF THE ROWLAND TYPE
Filed May 5, 1948  3 Sheets-Sheet 1

April 10, 1951  A. C. G. MENZIES ET AL  2,548,548
CONCAVE GRATING SPECTROGRAPH OF THE ROWLAND TYPE
Filed May 5, 1948  3 Sheets-Sheet 3

Inventors:
A. C. G. Menzies and
J. H. Dowell;
By their attorneys,
Baldwin, Wight & Prevost Patented Apr. 10, 1951

2,548,548

UNITED STATES PATENT OFFICE 2,548,548

CONCAVE GRATING SPECTROGRAPH OF THE ROWLAND TYPE

Alexander Charles George Menzies and John Hendri Dowell, London, England, assignors to Adam Hilger Limited, London, England, a British company Application May 5, 1948, Serial No. 25,264
In Great Britain January 29, 1947

4 Claims. (Cl. 88—14)

In a form of concave grating mounting known as the Eagle mounting and described in Astrophys. J. 31, p. 120 (March 1910) the grating, photographic plate or film, and slit are all arranged on the circumference of a circle known as the Rowland circle, whose diameter is equal to the radius of curvature of the concave grating. When so arranged the spectrum will come to a focus on the Rowland circle and the plate or film is therefore bent to the same radius as the circle.

Such spectrographs are usually of considerable size, the diameter of the Rowland circle being as much as 20 feet, and the spectrum being of such great length that it is necessary to photograph it in sections. In the mounting devised by Eagle the plate is fixed as regards linear movement but can be inclined at an angle. The grating can be adjusted to or from the plate and also inclined at an angle so that the plate and grating can be adjusted to remain on the Rowland circle. Thus by reducing the distance between the grating and plate and adjusting the inclination of the plate and grating to come on the Rowland circle different sections of the spectrum can be focused on the plate.

An automatic mounting has been described by A. Cotton, Comptes Rendus 186, p. 192, June 1928, and J. H. Dowell, Jour. Sc. Inst. vol. XVII, No. 8, August 1940, by means of which the plate and grating are connected by a lever system such that all the relative motions can be made together by operating a single lever. In this system the plate and grating are connected by levers whose lengths are each equal to half the diameter of the Rowland circle, the plate holder being pivoted about an axis passing through the slit and the grating capable of traversing along a line passing through the centre of the slit and also capable of rotating about a perpendicular axis passing through the line of traverse and grating radius of curvature.

As the lever lengths are equal to half the diameter of the Rowland circle a considerable amount of space in the spectrograph width is required to accommodate the levers when they are inclined at a large angle. As, however, concave gratings of 6 and 9 feet are commonly in use in spectrographs of this kind, the overall dimensions are very considerable.

The present invention has for its object to reduce the length dimensions of the spectrograph whilst retaining the advantages of automatic relative adjustment. A further object is to increase the wavelength range over which adjustment can be made for a given width of spectrograph.

A spectrograph of the concave grating type according to the invention is characterised by disposing the slit, grating and plate in front of a mirror, and providing mountings for these respective parts enabling the relative positions of the latter to be adjusted to deal with different portions of the wavelength range, the arrangement being such that the plate and the images in the mirror of the slit and of the gratings are maintained on a Rowland circle.

The invention may be embodied in various forms of construction, preferably in forms which include a mounting for the mirror which is movable towards and away from the slit under constraining means such as mechanical linkage which ensure that the geometrical surface containing the reflecting face of the mirror passes through the centre of the Rowland circle on the circumference of which the slit grating and plate are arranged.

Accordingly the slit, grating and plate may be disposed so that they occupy fixed relative positions, in any desired sequence, on an arc of limited extent on the circumference of a Rowland circle. The slit, grating and plate may be fixed so that the Rowland circle is immovable, in which case the mirror when moving towards and away from the slit is simultaneously tilted so that its face, or extension thereof, passes through the centre of that circle. Alternatively, the grating and plate may be mounted on a carrier pivoted at the slit so that the Rowland circle will swing as such about the slit as pivot, in which case the mirror will be caused to move parallel to itself to bring it to the position where its face, or extension thereof, passes through the centre of the Rowland circle in the particular situation the latter has assumed. The invention is illustrated in the accompanying drawings, in which Figure 1 illustrates one form of the invention wherein the grating and a plate holder are arranged on opposite sides of the slit;

Figure 1:
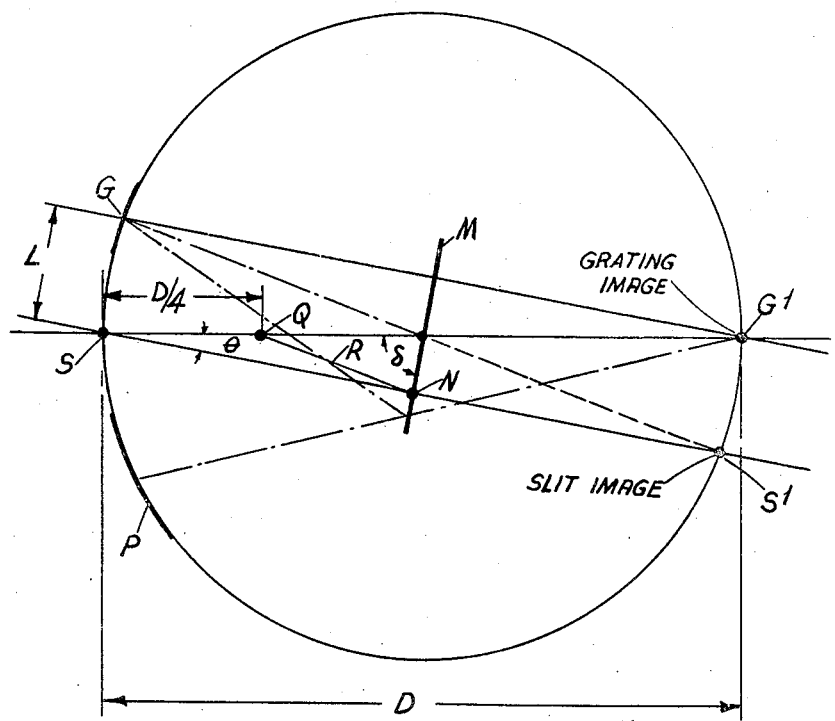

In the arrangement shown in Fig. 1 the grating G and the plate holder P are arranged on opposite sides of the slit S but the grating can also be placed between the slit and plate holder or beyond the plate holder.

In the case where different sections of the spectrum are brought into the width of the plate by rotating a carrier for the grating and plate about the axis of the slit and moving the mirror to or from the slit, the mirror mount is connected by a link R to a pin Q attached to the plate and grating carrier, the pin being placed at a distance from the slit equal to one quarter the diameter of the Rowland circle and the connecting link being of the same length. The pin Q on the carrier is so placed that when the grating image normal G'S passes through the centre of the slit S it will also pass through the axis of the pin Q. The mirror M is inclined at an angle to the grating image normal passing through the centre of the slit S, such that $$\cos \delta = \frac{L}{D}$$

where $\delta$ is the angle of the mirror face to the grating normal and L is the distance from the centre of the slit to the centre of the grating G and D is the diameter of the Rowland circle. The mirror M is traversed along an axis SS' normal to the mirror surface passing through the centre of the slit. This axis is inclined to the grating image normal when it passes through the centre of the slit so that $$\sin \theta = \frac{L}{D}$$

when $\theta$ is the angle which the mirror M axis makes to the grating axis. The link R connecting the pin Q on the plate and grating carrier to the mirror is connected to a pin N on the mirror mount whose axis passes through the point of intersection of the mirror surface and the mirror normal passing through the slit. As stated above the length of the link is $$\frac{D}{4}$$

Since the surface in which the mirror M is located passes through the centre of the Rowland circle it will be clear that the virtual image S' of the slit, which is formed on the opposite side of the mirror face on the normal to the mirror, will also be located on the Rowland circle and light will therefore fall on the grating as though it came from the virtual image of the slit S'.

Figure 2:
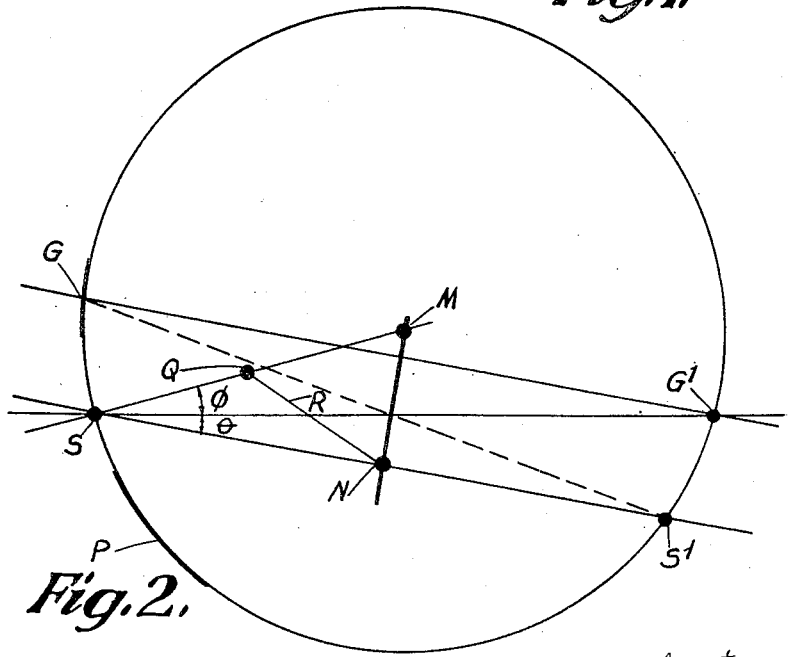
Figure 2 is a similar view after rotation of the carrier.

When the carrier is rotated through an angle $\phi$ (Fig. 2) and the mirror has moved parallel to itself so that the surface in which its face is located passes through the centre of the Rowland circle, the distance to the mirror from the slit measured normally to the mirror surface will be $$\frac{D}{2} \cos (\phi + \theta)$$

since $\phi$ is the angle which a line passing through the axis of the slit and the centre of the Rowland circle makes to a line passing through the centre of the slit and the centre of the grating. The distance of the pin on the plate and grating carrier from the slit axis measured along the mirror normal will be $\frac{1}{4} D \cos (\phi + \theta)$. The link of length $$\frac{D}{4}$$

will also be inclined at an angle $(\phi + \theta)$ to the mirror normal and the distance of the mirror surface to the slit axis measured along the mirror normal SN will be $2 \times \frac{1}{4} D \cos (\phi + \theta) = \frac{1}{2} D \cos (\phi + \theta)$, the required distance to maintain correct focal conditions.

As, however, the links are $\frac{1}{4}D$ in length it will be clear that they can be inclined at approximately twice the angle of a link $\frac{1}{2}D$ in length for a given width of spectrograph, and as a result, a wavelength range approximately twice as great can be recorded on the plate for a given width of spectrograph.

Since the grating, slit and plate are side by side it will be obvious that the width of the spectrograph is increased as compared with known arrangements but this additional width can be usefully employed since it will allow the spectrum to be adjusted to a position on the opposite side of the grating normal and this is very desirable in practice, but as before the links of $\frac{1}{4}D$ length will enable approximately twice the range to be obtained for a given width.

Figure 3:
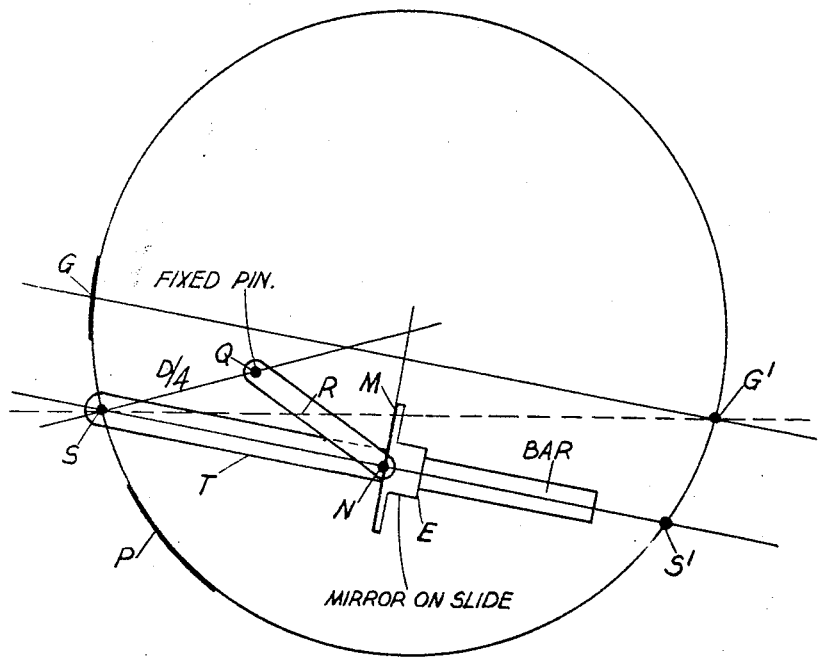
Figure 3 is an alternative arrangement wherein the grating and plate are fixed and the mirror is mounted on a sliding carriage.

In one alternative arrangement of the spectrograph the grating G and plate P are fixed and the mirror M is carried on a carriage E sliding on a bar T pivoted about the axis of the slit S, as shown in Fig. 3. The mirror carriage E is connected by the pin N to a link R of $$\frac{D}{4}$$

length pivoted on a fixed pin Q placed at a distance $$\frac{D}{4}$$

from the slit axis and at a distance $$\frac{D}{4} \sin \theta$$

from a normal to the grating image when it passes through the slit axis.

Rotation of the bar T will cause the mirror carriage E to move along the bar and be inclined at the required angle necessary for the focal conditions.

The face of the mirror is not necessarily a plane surface. A curved mirror may be employed, as for example a cylindrical mirror with its axis horizontal, of such curvature as will reduce the astigmatism which is present in all concave spectrographs of this kind or alternatively a figured mirror may be employed, that is a mirror which is of such shape as to give the best optical performance.

Figure 4:
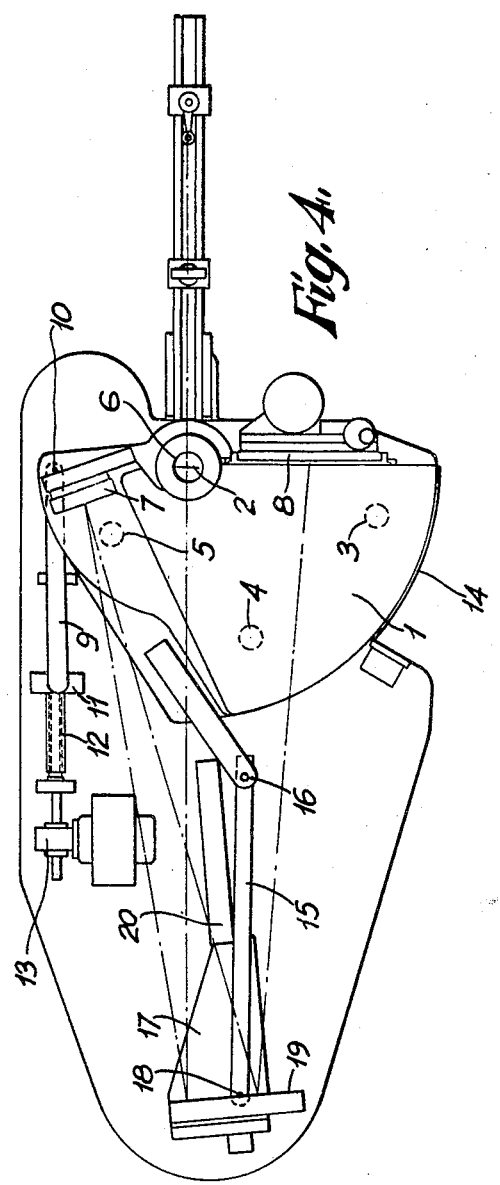
Figure 4 is a plan view of a spectrograph constructed in accordance with the invention.
Figure 5:
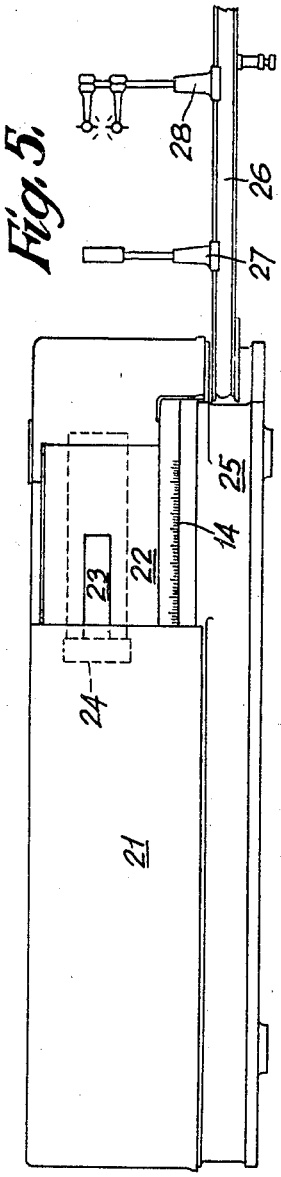
Figure 5 is a view in side elevation.

As an example, Fig. 4 illustrates a plan view and Fig. 5 side elevation of a spectrograph constructed in accordance with this invention.

The grating and plate holder carriage 1 is pivoted about the axis of the slit 2 and supported at three points on ball bearings 3, 4 and 5. The pivot consists of a large diameter pillar 6 which is of hollow form and of such size that the slit 2 can be mounted with the slit jaws on the axis of the pillar.

The grating 7 and plate or film holder 8 are mounted on the carriage 1 so that the grating and plate come on the Rowland circle passing through the axis of the slit. A link 9 is connected to the carriage by a pin 10 and to a nut 11 on a screw 12 which can be rotated by an electric motor 13, thus enabling the carriage to be rotated so as to incline the grating and plate at the required angle, the position being indicated by a scale 14 engraved to indicate the wavelength range included on the plate for any position of the carriage.

A second link 15 of length one quarter the diameter of the Rowland circle is connected to the carriage 1 by a pin 16 and to the mirror carriage 17 by a pin 18. The mirror 19 is mounted on the carriage 17 which may be traversed in the required direction by being slidably mounted on the bar 20. Light is excluded over the major part of the spectrograph by the case 21; as however the carriage 1 will have a considerable angular movement and the plateholder is preferably outside the case 21 in all positions, a semi-circular enclosure 22 (Fig. 5), is mounted on it, a slot 23 being provided to allow for transmission of the light transmitted from the slit to the grating and from the grating to the plate, and in order to exclude light entering the slot when it extends beyond the case 21 it is covered by a roller blind 24 (Figs. 4 and 5), the end of the blind being attached to the end of the plateholder framework.

Attached to the main base casting 25 is a bar 26 on which can be mounted a condenser 27 and light source 28 so that proper optical alignment is maintained.

What we claim is:

1. A concave grating spectrograph comprising a slit, a concave grating, a plate, mounting means for each of these elements maintaining them on the circumference of a Rowland circle, a mirror and mounting means maintaining at least a substantial part of the mirror within the Rowland circle so that the plane of the mirror passes through the center of the Rowland circle whereby an image of both the slit and the grating is formed on the circumference of the Rowland circle.

2. A concave grating spectrograph comprising a slit, a concave grating, a plate, mounting means for each of these elements maintaining them on the circumference of a Rowland circle, a mirror, mounting means maintaining at least a substantial part of the mirror within the Rowland circle so that the plane of the mirror passes through the center of the Rowland circle whereby an image of both the slit and the grating is formed on the circumference of the Rowland circle, and means for relatively moving the mirror towards and away from the slit.

3. A concave grating spectrograph according to claim 2 in which the slit, the grating and the plate lie on a fixed Rowland circle and in which the means for moving the mirror comprises a bar pivoted about the axis of the slit, a carriage adapted to slide on the bar and to carry the mirror so that the plane of the reflecting surface is at right angles to said bar, and a link hinged at both ends joining the carriage to a point midway between the slit and the center of the Rowland circle.

4. A concave grating spectrograph according to claim 2 comprising a carrier supporting the plate and grating and adapted to pivot about the slit so that the Rowland circle may be swung about the slit as pivot, a field bar whose longitudinal axis is in line with the slit, a carriage adapted to slide on said bar and to carry the mirror so that the plane of the reflecting surface is at right angles to said bar, and a link hinged at both ends joining the carriage to a point on the said carrier midway between the slit and the center of the Rowland circle.

ALEXANDER CHARLES GEORGE MENZIES.
JOHN HENDRI DOWELL.

REFERENCES CITED

The following references are of record in the file of this patent:

UNITED STATES PATENTS

| Number | Name | Date |
|---|---|---|
| 2,314,800 | Pineo | Mar. 23, 1943 |
| 2,342,737 | Jacobsohn | Feb. 29, 1944 |

OTHER REFERENCES

Spectroscopy, Text by Baly, volume I, pages 195 to 197, published by Longmans, Green & Co., New York, 1924.

Optical Methods of Chemical Analysis, Text by Gibb, pages 37 and 38, published by McGraw-Hill Book Co., New York, 1942.

Scientific American, March 1944, pages 140, 141 (Photostat copy in 88–14 S).